(12) United States Patent
Wagner

(10) Patent No.: US 8,514,061 B2
(45) Date of Patent: Aug. 20, 2013

(54) DISPLAY AND METHOD FOR CALCULATING AN "ECO" METER INDEX TO BE DISPLAYED FOR THE DRIVER OF A MOTOR VEHICLE

(75) Inventor: Michael Wagner, Rimbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 462 days.

(21) Appl. No.: 12/904,886

(22) Filed: Oct. 14, 2010

(65) Prior Publication Data

US 2011/0148614 A1    Jun. 23, 2011

(30) Foreign Application Priority Data

Oct. 14, 2009 (DE) .......................... 10 2009 049 367

(51) Int. Cl.
*G08B 21/00* (2006.01)

(52) U.S. Cl.
USPC .......................... 340/439; 73/114.53; 701/101

(58) Field of Classification Search
USPC ................. 340/438, 439, 441, 456, 457, 459; 73/114.52, 114.53, 114.54; 701/99, 101, 701/102, 103, 104, 110
See application file for complete search history.

(56) References Cited

U.S. PATENT DOCUMENTS

| 4,354,173 A | 10/1982 | Kuhn et al. |
| 4,494,404 A | 1/1985 | Strifler |
| 5,781,872 A | 7/1998 | Konishi et al. |
| 7,772,970 B2 | 8/2010 | Masuda et al. |
| 2008/0143505 A1 | 6/2008 | Maruyama et al. |

FOREIGN PATENT DOCUMENTS

| DE | 2928318 A1 | 1/1981 |
| DE | 3019711 A1 | 12/1981 |
| DE | 3145687 C1 | 6/1983 |
| DE | 102005045265 A1 | 3/2007 |
| DE | 102007016615 A1 | 10/2007 |
| DE | 60316549 T2 | 5/2008 |
| EP | 0600400 A1 | 6/1994 |
| EP | 1718499 A1 | 11/2006 |
| EP | 1890110 A2 | 2/2008 |

*Primary Examiner* — Jeffery Hofsass
(74) *Attorney, Agent, or Firm* — Ingrassia Fisher & Lorenz, P.C.

(57) ABSTRACT

A device and method are provided for calculating an "eco" meter index that indicates the driving efficiency and to a display of this "eco" meter index for the driver of a motor vehicle. The display is based on calculating an "eco" meter index in dependence on the accelerator pedal position (Acc Pedal), the engine speed (RPM), the vehicle speed ($V_{Speed}$) and the engaged gear in such a way that a sum is formed with a portion that is directly proportional to the current accelerator pedal position and at least one portion that is dependent on the engine speed and/or the vehicle speed.

14 Claims, 3 Drawing Sheets

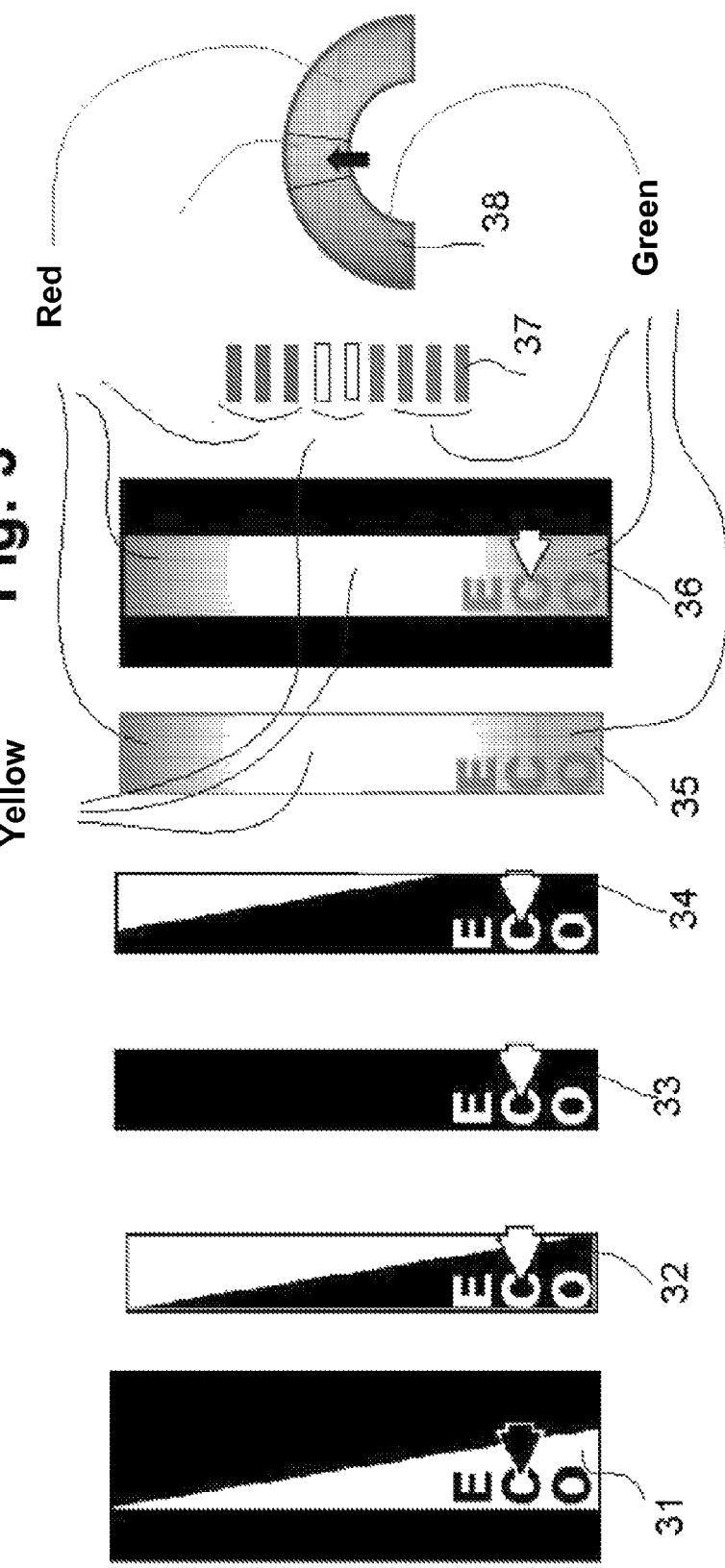

DISPLAY AND METHOD FOR CALCULATING AN "ECO" METER INDEX TO BE DISPLAYED FOR THE DRIVER OF A MOTOR VEHICLE

CROSS-REFERENCE TO RELATED APPLICATION

This application claims priority to German Patent Application No. 102009049367.0, filed Oct. 14, 2009, which is incorporated herein by reference in its entirety.

TECHNICAL FIELD

The technical field to a method for calculating an "eco" meter index that indicates the driving efficiency and to a display of this "eco" meter index for the driver of a motor vehicle.

BACKGROUND

A method for determining the optimal driving strategy for a route to be driven is described in EP1890110A2. In this case, a motor vehicle display is provided that shows a deviation from a certain optimum of the operating state of the motor vehicle and is combined with a display that shows a measure for improving the operating state. The operating state may be an energy consumption state and the improvement measure may be a positive or negative change of an operating parameter. The display is realized in the form of a bar graph in this case.

It is at least one objective is to make available a method and a device for calculating and displaying an "eco" meter index, the graphic display of which provides the driver of a motor vehicle with an effective and comprehensible training method for learning how to drive in an economical and more environmentally compatible fashion. In addition, other objectives, desirable features, and characteristics will become apparent from the subsequent summary and detailed description, and the appended claims, taken in conjunction with the accompanying drawings and this background.

SUMMARY

According to an embodiment of the invention, a method is provided for graphically visualizing the current driving state of a motor vehicle with an internal combustion engine or a hybrid drive with respect to a minimal fuel consumption and/or minimal $CO_2$ emission, wherein the display is based on an algorithm for calculating an "eco" meter index in dependence on the accelerator pedal position, the engine speed, the vehicle speed and the engaged gear, and wherein the algorithm is formed of a sum with a portion that is directly proportional to the current accelerator pedal position and at least one portion that is dependent on the engine speed and/or the vehicle speed.

At least one advantage of the method can primarily be seen in that the device provides the driver of a motor vehicle with quickly recognizable visual information that is intended to enable the driver to prevent intense acceleration processes, high engine speeds and high vehicle speeds. A training effect that enables the motor vehicle driver to learn how to drive economically should be achieved as the result of the thusly processed information.

In one embodiment of the invention, the "eco" meter index may be displayed in color in such a way that calculated values for the "eco" meter index below a first threshold value are displayed in green, values between a first and a second threshold value are displayed in yellow and values higher than the second threshold value are displayed in red. In another embodiment of the invention, the "eco" meter index may be displayed in color in such a way that the calculated values for the "eco" meter index represent a color gradient in the spectral range between green, yellow and red.

BRIEF DESCRIPTION OF THE DRAWINGS

The present invention will hereinafter be described in conjunction with the following drawing figures, wherein like numerals denote like elements, and:

FIG. 3 shows exemplary embodiments of the inventive eco meter index.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
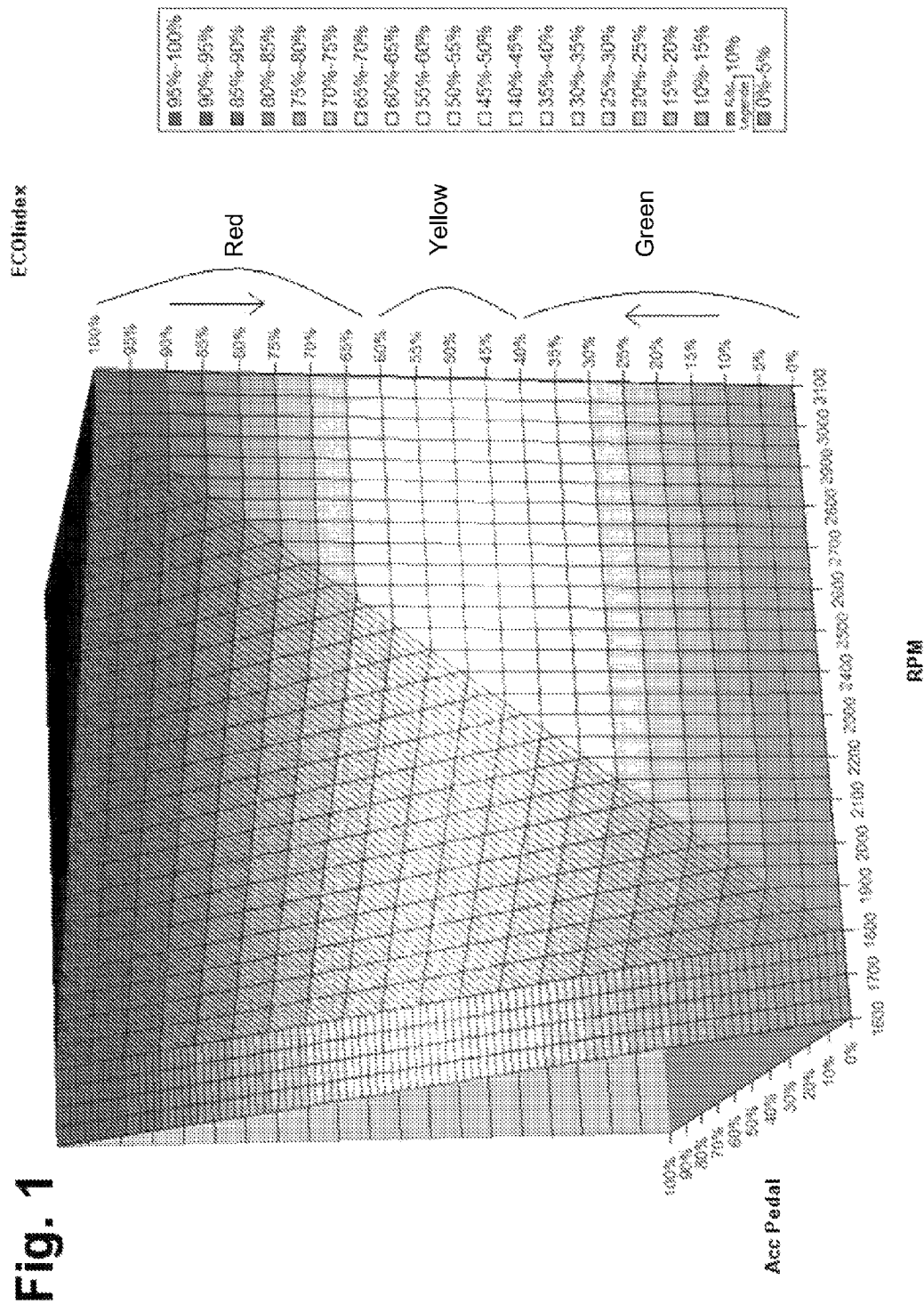
FIG. 1 shows a schematic three-dimensional representation of an eco meter index in accordance with an embodiment of the invention for the engaged gears from the first gear up to the penultimate gear that can be engaged, where the intensity of the colors green and red becomes weaker in the direction of the arrow.

FIG. 1 shows a three-dimensional representation of the family of characteristics of an "eco" meter index in accordance with an embodiment of the invention for the engaged gears from the first gear up to the penultimate gear that can be engaged. The color gradient of the family of characteristics corresponds to the color gradient of the exemplary embodiments, in which the "eco" meter index is displayed in color for the driver of a motor vehicle. In this case, the driving states of the motor vehicle that are optimized with respect to the consumption are displayed in the family of characteristics in shades of green and the non-optimized driving states are displayed in shades of yellow or red. The arrow at red in FIG. 1 represents the color gradient from dark red to bright red and the arrow at green in FIG. 1 represents the color gradient from dark green to bright green. The color gradient for the color yellow varies between the shades of bright red and bright green. In the exemplary embodiment shown, the color classification is realized in five percent increments in accordance with the calculated values of the legend of FIG. 1.

In this case, the values are calculated based on the formula: $ECO_{index} = Acc\ Pedal + g*(RPM-N_U)/(N_O-N_u)*100\% + (1-g)*(V_{Speed}-V_U)/(V_O-V_U)*100\%$, where Acc Pedal represents the position of the accelerator pedal, RPM represents the engine speed, $V_{Speed}$ represents the vehicle speed and g has the value 1 for the engaged gears from the first up to the penultimate gear that can be engaged and the value 0 for the ultimate gear. Consequently, only the value $ECO_{Index} = Acc\ Pedal + (RPM-N_U)/(N_O-N_U)*100\%$ is relevant for the engaged gears from the first up to the penultimate gear that can be engaged. The family of characteristics is green between 0 and a first threshold value for the "eco" meter index to be defined, yellow for values between a first threshold value and a second threshold value to be defined and red for values higher than the second threshold value.

In one preferred exemplary embodiment, the following values apply to the family of characteristics according to FIG. 1: lower engine speed threshold $N_U$=1800 rpm, upper engine speed threshold $N_O$=3000 rpm.

Figure 2:
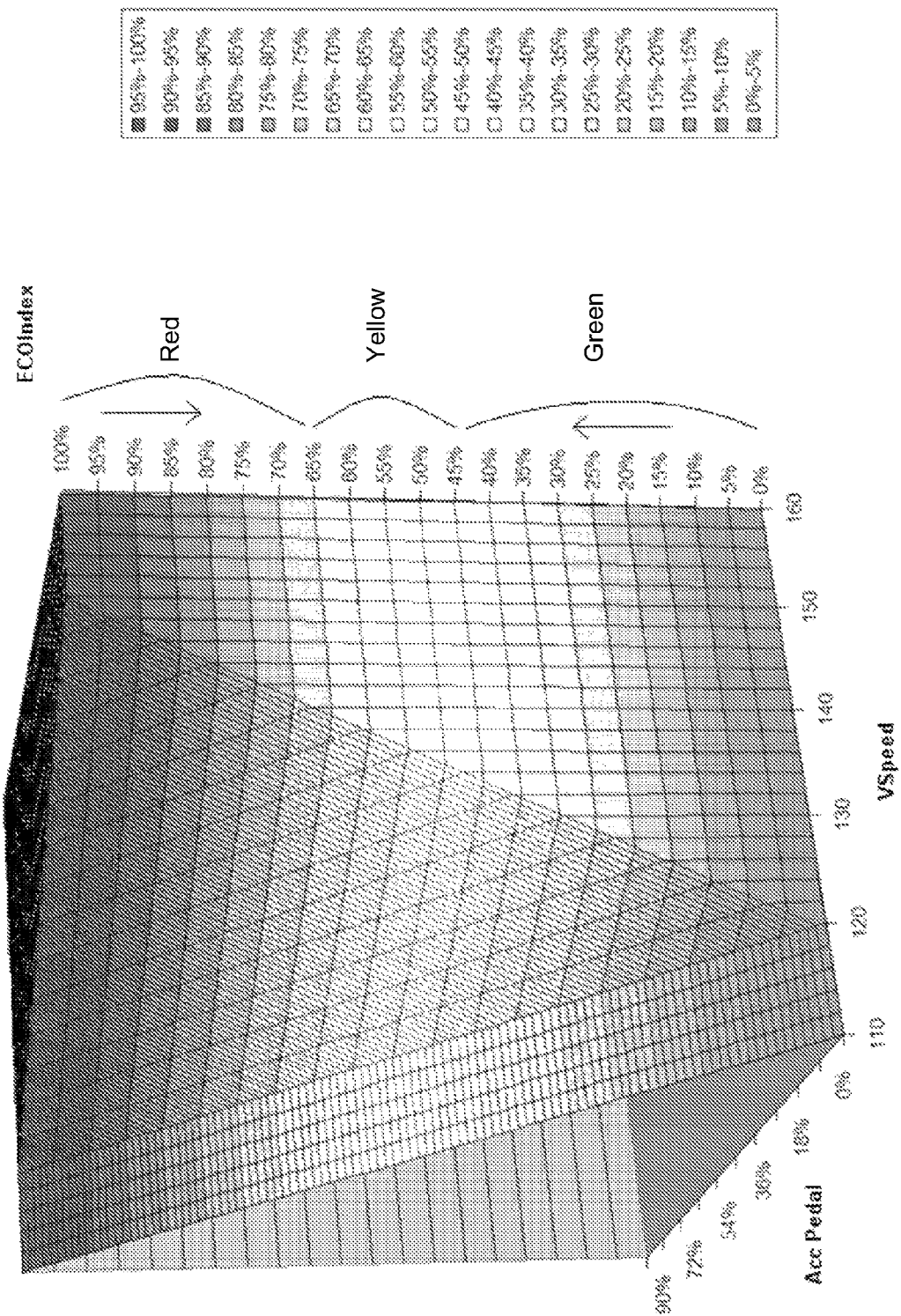
FIG. 2 shows a schematic three-dimensional representation of the eco meter index for the ultimate gear that can be engaged, where the intensity of the colors green and red becomes weaker in the direction of the arrow.

FIG. 2 shows a three-dimensional representation of the family of characteristics of the inventive "eco" meter index for the ultimate gear that can be engaged. Similarly to FIG. 1, the color gradient of the family of characteristics corresponds to the color gradient of the exemplary embodiments, in which the "eco" meter index is displayed in color for the driver of a motor vehicle. In this case, the driving states of the motor vehicle that are optimized with respect to the consumption are also displayed in the family of characteristics in shades of green and the non-optimized driving states are displayed in shades of yellow or red. The arrow at red in FIG. 2 represents the color gradient from dark red to bright red and the arrow at green in FIG. 2 represents the color gradient from dark green to bright green. The color gradient for the color yellow varies between the shades of bright red and bright green. In the exemplary embodiment shown, the color classification is realized in five percent increments in accordance with the calculated values of the legend of FIG. 2.

Only the value $ECO_{Index}$=Acc Pedal+$(V_{Speed}-V_U)/(V_O-V_U)$*100% is relevant for the ultimate gear that can be engaged. The family of characteristics is green between 0 and a first threshold value for the "eco" meter index to be defined, yellow for values between a first threshold value and a second threshold value to be defined and red for values higher than the second threshold value.

In one preferred exemplary embodiment, the following values apply to the family of characteristics according to FIG. 1: lower vehicle speed threshold $V_U$=120 km/h, upper vehicle speed threshold $V_O$=150 km/h.

FIG. 3 shows several exemplary embodiments of the inventive "eco" meter index for the driver of a motor vehicle. These may be realized in the form of pointer-type displays like the exemplary embodiments 31, 32, 33, 34 in black and white. In this case, the driving states of the motor vehicle that are optimized with respect to the consumption are displayed with pointer regions labeled ECO and the non-optimized driving states are displayed in the remaining region.

The exemplary embodiments 35, 36 and 38 display the driving states of the motor vehicle that are optimized with respect to the consumption in shades of green and the non-optimized driving states in shades of yellow or red. In this case, the displayed colors correspond to those of the families of characteristics according to FIG. 1 and FIG. 2. Pointer positions at the level of the region labeled "ECO" correspond to the values in the green range of the families of characteristics. The display 37 shows the driving states of the motor vehicle that are optimized with respect to the consumption with green light-emitting diodes and the non-optimized driving states with yellow or red light-emitting diodes.

Although the embodiments of the present invention is disclosed with reference to preferred embodiments, these embodiments are not restrictive and a person skilled in the art can make changes and modifications without deviating from the object and the scope of protection of the present invention. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for graphically visualizing a current driving state of a motor vehicle, comprising the steps of:
   calculating with a processor an eco meter index in dependence on an accelerator pedal position, an engine speed, a vehicle speed, and an engaged gear;
   forming with the processor a sum with a portion that is directly proportional to a current accelerator pedal position and at least one portion that is dependent on at least on of the engine speed or the vehicle speed; and
   displaying, with a display, the eco meter index for graphically visualizing the current driving state of the motor vehicle.

2. The method according to claim 1, wherein the displaying, with the display, the eco meter index for graphically visualizing the current driving state of the motor vehicle is conducted with respect to a minimal fuel consumption.

3. The method according to claim 1, wherein the displaying, with the display, the eco meter index for graphically visualizing the current driving state of the motor vehicle is conducted with respect to a minimal $CO_2$ emission.

4. The method according to claim 1, the sum is formed of a summand that is dependent on the accelerator pedal position, a summand for the engaged gear from the first up to a penultimate gear that can be engaged,
   wherein the summand is formed of a quotient from a difference between an instantaneous engine speed and a predetermined lower engine speed threshold and a difference between a predetermined upper engine speed threshold and the predetermined lower engine speed threshold, as well as a summand for an ultimate gear that can be engaged,
   wherein this summand is formed of a second quotient from the difference between an instantaneous vehicle speed and a predetermined lower vehicle speed threshold and the difference between a predetermined upper vehicle speed threshold and the predetermined lower vehicle speed threshold.

5. The method according to claim 4, wherein the values for vehicle speed thresholds and engine speed thresholds are read out of an engine management of the motor vehicle in a form of adjustment values.

6. The method according to claim 5, wherein a lower vehicle speed threshold has a first substantially constant value of approximately 120 and an upper vehicle speed threshold has a second substantially constant value of approximately 150, and in that a lower engine speed threshold has a third substantially constant value of approximately 1800 and an upper engine speed threshold has a fourth substantially constant value of approximately 3000.

7. A device for graphically visualizing a current driving state of a motor vehicle, comprising:
   a processor adapted to:
   calculate an eco meter index in dependence on an accelerator pedal position, an engine speed, a vehicle speed and an engaged gear,
   forming a sum with a portion that is directly proportional to at least one of a current accelerator pedal position or at least one portion that is dependent on the engine speed or the vehicle speed; and
   a display adapted to display the eco meter index for graphically visualizing the current driving state of the motor vehicle.

8. The device according to claim 7, wherein the eco meter index for graphically visualizing the current driving state of the motor vehicle is conducted with respect to a minimal fuel consumption.

9. The device according to claim 7 wherein the eco meter index for graphically visualizing the current driving state of the motor vehicle is conducted with respect to a minimal $CO_2$ emission 10. The device according to claim 9, wherein the display is adapted to show the current driving state of the motor vehicle that are optimized with respect to a consumption in shades of green and non-optimized driving states in shades of yellow.

11. The device according to claim 9, wherein the display is adapted to show the current driving state of the motor vehicle that are optimized with respect to a consumption in shades of green and non-optimized driving states in shades of red.

12. The device according to claim 9, wherein the display is adapted to show the current driving state of the motor vehicle that are optimized with respect to a consumption with pointer regions labeled ECO and non-optimized driving states in a remaining region.

13. The device according to claim 9, wherein the display is adapted to show the current driving state of the motor vehicle that are optimized with respect to a consumption with green light-emitting diodes and non-optimized driving states with yellow light-emitting diodes.

14. The device according to claim 9, wherein the display is adapted to show the current driving state of the motor vehicle that are optimized with respect to a consumption with green light-emitting diodes and non-optimized driving states with red light-emitting diodes.

* * * * *